United States Patent
Hellring et al.

(10) Patent No.: US 12,463,220 B2
(45) Date of Patent: *Nov. 4, 2025

(54) ELECTRODE BINDER SLURRY COMPOSITION FOR LITHIUM ION ELECTRICAL STORAGE DEVICES

(71) Applicant: PPG Industries Ohio, Inc., Cleveland, OH (US)

(72) Inventors: Stuart D. Hellring, Pittsburgh, PA (US); Debra L. Singer, Wexford, PA (US); Matthew E. Stewart, Pittsburgh, PA (US); Jacob W. Mohin, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,154

(22) Filed: Oct. 2, 2023

(65) Prior Publication Data

US 2024/0030447 A1 Jan. 25, 2024

Related U.S. Application Data

(63) Continuation of application No. 16/629,228, filed as application No. PCT/US2018/041046 on Jul. 6, 2018, now Pat. No. 11,777,096.

(Continued)

(51) Int. Cl.
*H01M 4/62* (2006.01)
*H01G 11/30* (2013.01)
(Continued)

(52) U.S. Cl.
CPC ............ *H01M 4/623* (2013.01); *H01G 11/30* (2013.01); *H01G 11/62* (2013.01); *H01G 11/68* (2013.01); *H01G 11/70* (2013.01); *H01M 4/625* (2013.01)

(58) Field of Classification Search
CPC .... H01M 4/623; H01M 4/625; H01M 4/0404; H01M 4/62; H01M 4/13; H01M 4/661;
(Continued)

(56) References Cited

U.S. PATENT DOCUMENTS 6,168,885 B1 * 1/2001 Narang ............ H01M 10/0569
429/214
9,236,612 B2 1/2016 Igarashi et al.
(Continued)

FOREIGN PATENT DOCUMENTS

CA 3069121 1/2019
CA 3069166 1/2019
(Continued)

OTHER PUBLICATIONS

"New Polymer Synthesis and Preparation Technology", Chemistry and Chemical Engineering Excellent Series Books, Harbin Institute of Technology Press, Zhen Hu, Chunhua Zhang, Yan Liang.
(Continued)

*Primary Examiner* — Daniel S Gatewood
(74) *Attorney, Agent, or Firm* — Leech Tishman Fuscaldo & Lampl

(57) ABSTRACT

The present invention provides a slurry composition comprising a binder comprising a polymer comprising a fluoropolymer dispersed in a liquid medium; an adhesion promoter; and at least one of an electrochemically active material or an electrically conductive agent. The present invention also provides electrodes and electrical storage devices.

19 Claims, 1 Drawing Sheet

Related U.S. Application Data

(60) Provisional application No. 62/529,497, filed on Jul. 7, 2017.

(51) Int. Cl.
*H01G 11/62* (2013.01)
*H01G 11/68* (2013.01)
*H01G 11/70* (2013.01)

(58) Field of Classification Search
CPC ........... H01M 10/052; H01M 10/0568; H01M 10/0569; H01G 11/30; H01G 11/62; H01G 11/68; H01G 11/70; H01G 11/38; Y02E 60/10
See application file for complete search history.

(56) References Cited

U.S. PATENT DOCUMENTS

| | | |
|---|---|---|
| 9,273,399 B2 | 3/2016 | Hellring et al. |
| 9,385,374 B2 | 7/2016 | Hellring et al. |
| 9,466,830 B1 | 10/2016 | Shan et al. |
| 9,761,903 B2 | 9/2017 | Hellring et al. |
| 10,033,043 B2 | 7/2018 | Hellring et al. |
| 10,128,541 B2 | 11/2018 | Itakura et al. |
| 10,388,961 B2 | 8/2019 | Fukumine et al. |
| 10,619,070 B2 | 4/2020 | Kobayashi et al. |
| 10,763,490 B2 | 9/2020 | Daughenbaugh et al. |
| 10,964,949 B2 | 3/2021 | Hellring et al. |
| 11,228,037 B2 | 1/2022 | Huang et al. |
| 11,424,451 B2 | 8/2022 | Hellring et al. |
| 11,764,361 B2 | 9/2023 | Hellring et al. |
| 11,799,086 B2 | 10/2023 | Hellring et al. |
| 11,843,118 B2 | 12/2023 | Hellring et al. |
| 12,191,496 B2 | 1/2025 | Hellring et al. |
| 2002/0192557 A1 | 12/2002 | Choi et al. |
| 2004/0029014 A1 | 2/2004 | Hwang et al. |
| 2006/0093920 A1 | 5/2006 | Cheon et al. |
| 2010/0304270 A1 | 12/2010 | Amin-Sanayei et al. |
| 2011/0318638 A1 | 12/2011 | Koh et al. |
| 2012/0217434 A1 | 8/2012 | L'Abee |
| 2012/0244334 A1 | 9/2012 | Park et al. |
| 2014/0335410 A1 | 11/2014 | Loveridge et al. |
| 2015/0099171 A1 | 4/2015 | Alarco et al. |
| 2015/0200398 A1* | 7/2015 | Yeou ................. H01M 4/622 252/500 |
| 2016/0204465 A1 | 7/2016 | Mimura et al. |
| 2017/0062828 A1 | 3/2017 | Sonobe et al. |
| 2017/0077547 A1 | 3/2017 | Takami et al. |
| 2017/0110733 A1 | 4/2017 | Yoon et al. |
| 2017/0207487 A1 | 7/2017 | Itakura et al. |
| 2017/0324096 A1 | 11/2017 | Korchev et al. |
| 2018/0114988 A1 | 4/2018 | Yoon et al. |
| 2018/0151909 A1 | 5/2018 | Yoo et al. |
| 2018/0269484 A1 | 9/2018 | Kobayashi et al. |
| 2018/0301705 A1 | 10/2018 | Hellring et al. |
| 2020/0136146 A1 | 4/2020 | Hellring et al. |
| 2020/0176777 A1 | 6/2020 | Hellring et al. |
| 2020/0295373 A1 | 9/2020 | Hellring et al. |
| 2021/0242447 A1 | 8/2021 | Jiang et al. |
| 2024/0021831 A1 | 1/2024 | Hellring et al. |
| 2024/0055612 A1 | 2/2024 | Hellring et al. |

FOREIGN PATENT DOCUMENTS

| | | |
|---|---|---|
| CN | 104094447 A | 10/2014 |
| CN | 104497190 B | 9/2016 |
| CN | 106299379 B | 2/2019 |
| JP | H10172573 A | 6/1998 |
| JP | H11329904 A | 11/1999 |
| JP | 2000150320 A | 5/2000 |
| JP | 2000182606 A | 6/2000 |
| JP | 2002260666 A | 9/2002 |
| JP | 2003257433 A | 9/2003 |
| JP | 2003317722 A | 11/2003 |
| JP | 2007273639 A | 10/2007 |
| JP | 2009063907 A | 3/2009 |
| JP | 4325002 B2 | 9/2009 |
| JP | 2010049872 A | 3/2010 |
| JP | 2013084351 A | 5/2013 |
| JP | 2014181252 A | 9/2014 |
| JP | 2016181479 A | 10/2016 |
| JP | 2016201244 A | 12/2016 |
| JP | 2017010093 A | 1/2017 |
| JP | 2014-132591 A | 7/2017 |
| KR | 20160007413 A | 1/2016 |
| KR | 20160082503 A | 7/2016 |
| KR | 10-2016-0138552 A | 12/2016 |
| WO | 2000049103 A1 | 8/2000 |
| WO | 2004049475 A1 | 6/2004 |
| WO | 2008129041 A1 | 10/2008 |
| WO | 2009063907 A1 | 5/2009 |
| WO | 2012/124582 A1 | 9/2012 |
| WO | 2013183717 A1 | 12/2013 |
| WO | 2015064999 A1 | 5/2015 |
| WO | 2015153583 A1 | 10/2015 |
| WO | 2016190666 A1 | 12/2016 |
| WO | 2017010093 A1 | 1/2017 |
| WO | 2017056974 A1 | 4/2017 |
| WO | 2019010388 A1 | 1/2019 |

OTHER PUBLICATIONS

"Green Plasticizers", Scientific and Technical Documentation Press, Beijing China, Oct. 2011, Duoren Wang.
ASTM Designation: D 3539—87 (Reapproved 1996). Standard Test Methods for Evaporation Rates of Volatile Liquids by Shell Thin-Film Evaporometer (Year: 1996).

* cited by examiner

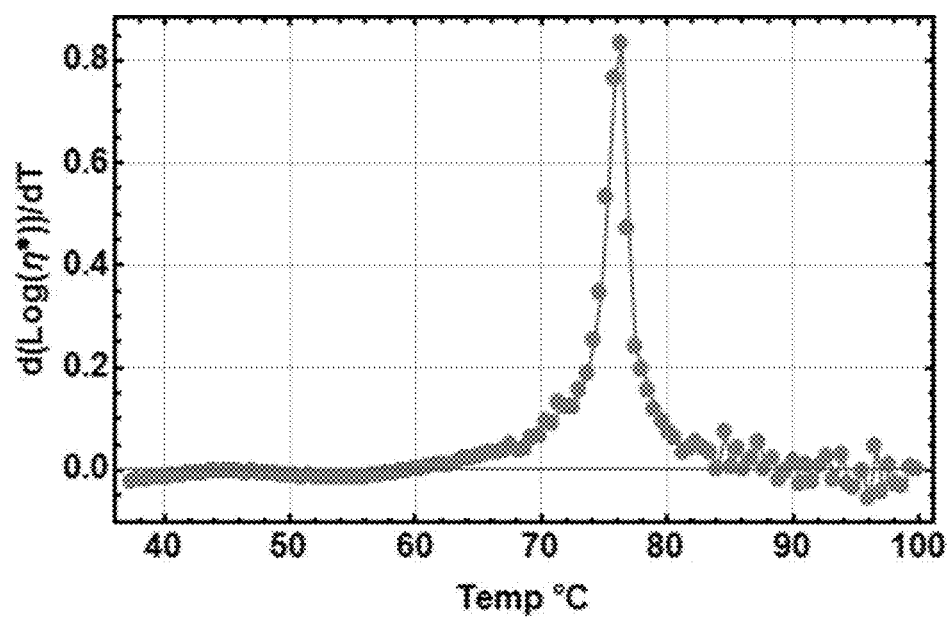

ELECTRODE BINDER SLURRY COMPOSITION FOR LITHIUM ION ELECTRICAL STORAGE DEVICES

CROSS-REFERENCE TO RELATED APPLICATIONS

This application claims the benefit of U.S. application Ser. No. 16/629,228, filed on Jan. 7, 2020, as a national stage entry of Int'l App. Ser. No. PCT/US2018/041046, filed on Jul. 6, 2018, that claimed the benefit of U.S. Prov. App. Ser. No. 62/529,497, filed on Jul. 7, 2017, each of which are incorporated herein by reference.

FIELD OF THE INVENTION

The invention relates to fluoropolymer, such as polyvinylidene fluoride (PVDF), slurry compositions for manufacturing electrodes for use in electrical storage devices, such as batteries.

BACKGROUND OF THE INVENTION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight.

Polyvinylidene fluoride, because of its excellent electrochemical resistance, has been found to be a useful binder for forming electrodes to be used in electrical storage devices. Typically, the polyvinylidene fluoride is dissolved in an organic solvent and the electrode material, that is, the electrochemically active compound and usually an electrically conductive material such as a carbonaceous material, is combined with the PVDF solution to form a slurry that is applied to a metal foil or mesh to form the electrode.

The role of the organic solvent is to dissolve PVDF in order to provide good adhesion between the electrode material particles and the metal foil or mesh upon evaporation of the organic solvent. Currently, the organic solvent of choice is N-methyl-2-pyrrolidone (NMP). PVDF binders dissolved in NMP provide superior adhesion and an interconnectivity of all the active ingredients in the electrode composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between particles.

Unfortunately, NMP is a toxic material and presents health and environmental issues. It would be desirable to replace NMP as a solvent for PVDF binders. However, NMP is somewhat unique in its ability to dissolve PVDF that is not nearly as soluble in other organic solvents.

To effectively employ PVDF compositions in electrode-forming processes in organic solvent other than NMP, the PVDF must be dispersed in the solvent. However, the dispersion must be compatible with current manufacturing practices and provide desired properties of the intermediate and final products. Some common criteria include: a) stability of the fluoropolymer dispersion, having sufficient shelf-life, b) stability of the slurry after admixing the electrochemically active and/or electroconductive powders with the dispersion, c) appropriate viscosity of the slurry to facilitate good application properties, and d) sufficient interconnectivity within the electrode.

Waterborne PVDF dispersions have also been considered, but the resulting electrode coatings often demonstrate decreased peel strength compared to solventborne counterparts.

It is therefore an objective of the present invention to provide stable PVDF dispersions having good application properties for use in preparing electrode-forming compositions, which enable production of high quality electrodes having interconnectivity and satisfactory peel strength for batteries and other electrical storage devices, avoiding the afore-mentioned disadvantages associated with the use of N-methyl-2-pyrrolidone.

SUMMARY OF THE INVENTION

The present invention provides a slurry composition comprising an electrochemically active material; a binder comprising a polymer comprising a fluoropolymer dispersed in a liquid medium; and an adhesion promoter.

The present invention also provides a slurry composition comprising an electrically conductive agent; a binder comprising a polymer comprising a fluoropolymer dispersed in a liquid medium; and an adhesion promoter.

The present invention further provides an electrode comprising an electrical current collector; and a film formed on the electrical current collector, wherein the film is deposited from a slurry composition comprising an electrochemically active material; an electrically conductive agent; a binder comprising a polymer comprising a fluoropolymer dispersed in a liquid medium; and an adhesion promoter.

The present invention also provides an electrical storage device comprising an electrode comprising an electrical current collector; and a film formed on the electrical current collector, wherein the film is deposited from a slurry composition comprising an electrochemically active material; an electrically conductive agent; a binder comprising a polymer comprising a fluoropolymer dispersed in a liquid medium; and an adhesion promoter; a counter electrode; and an electrolyte.

DESCRIPTION OF THE DRAWING

FIG. 1 is a graph illustrating the first derivative of Log viscosity versus temperature, wherein the peak maximum is used to determine the dissolution temperature of PVDF dispersed in 1,2,3-triacetoxypropane (triacetin) from the abscissa.

DETAILED DESCRIPTION

The present invention is directed to a slurry composition comprising an electrochemically active material; a binder comprising a polymer comprising a fluoropolymer dispersed in a liquid medium; and an adhesion promoter. The slurry composition may optionally further comprise a dispersant and/or an electrically conductive agent.

The slurry composition comprises an electrochemically active material. The material constituting the electrochemically active material contained in the slurry is not particularly limited and a suitable material can be selected according to the type of an electrical storage device of interest.

The electrochemically active material may comprise a material for use as an active material for a positive electrode. The electrochemically active material may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Non-limiting examples of materials capable of lithium conversion include sulfur, $LiO_2$, $FeF_2$ and $FeF_3$, Si, aluminum, tin, SnCo, $Fe_3O_4$, and combinations thereof.

The electrochemically active material may comprise a material for use as an active material for a negative electrode. The electrochemically active material may comprise graphite, lithium titanate, silicon compounds, tin, tin compounds, sulfur, sulfur compounds, or a combination thereof.

The electrochemically active material may be present in the slurry in amounts of 45% to 95% by weight, such as 70% to 98% by weight, based on the total solids weight of the slurry.

According to the present invention, the binder comprises a polymer comprising a fluoropolymer dispersed in liquid medium. The fluoropolymer may serve as all or a component of the binder for the slurry composition.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR and from Inner Mongolia 3F Wanhao Fluorochemical Co., Ltd.

The fluoropolymer may comprise a nanoparticle. As used herein, the term "nanoparticle" refers to particles having a particle size of less than 1,000 nm. The fluoropolymer may have a particle size of at least 50 nm, such as at least 100 nm, such as at least 250 nm, such as at least 300 nm, and may be no more than 900 nm, such as no more than 600 nm, such as no more than 450 nm, such as no more than 400 nm, such as no more than 300 nm, such as no more than 200 nm. The fluoropolymer nanoparticles may have a particle size of 50 nm to 900 nm, such as 100 nm to 600 nm, such as 250 nm to 450 nm, such as 300 nm to 400 nm, such as 100 nm to 400 nm, such as 100 nm to 300 nm, such as 100 nm to 200 nm. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in the binder in amounts of 40% to 100% by weight, such as 40% to 96% by weight, such as 50% to 90% by weight, based on the total weight of the binder solids.

The liquid medium of the slurry composition may comprise an organic medium. As used herein, the term "organic medium" refers to a liquid medium comprising less than 50% by weight water, based on the total weight of the organic medium. Such organic mediums may comprise less than 40% by weight water, or less than 30% by weight water, or less than 20% by weight water, or less than 10% by weight water, or less than 5% by weight water, or less than 1% by weight water, or less than 0.1% by weight water, based on the total weight of the organic medium, or may be free of water. Organic solvent(s) comprise more than 50% by weight of the organic medium, such as at least 70% by weight, such as at least 80% by weight, such as at least 90% by weight, such as at least 95% by weight, such as at least 99% by weight, such as at least 99.9% by weight, such as 100% by weight, based on the total weight of the organic medium. The organic solvent(s) may comprise 50.1% to 100% by weight, such as 70% to 100% by weight, such as 80% to 100% by weight, such as 90% to 100% by weight, such as 95% to 100% by weight, such as 99% to 100% by weight, such as 99.9% to 100% by weight, based on the total weight of the organic medium.

The organic medium may comprise, consist essentially of, or consist of, for example, ketones such as methyl ethyl ketone, cyclohexanone and isophorone, ethers such as the $C_1$ to $C_4$ alkyl ethers of ethylene and propylene glycol, butyl pyrrolidone, trialkyl phosphate, 1,2,3-triacetoxypropane, 3-methoxy-N,N-dimethylpropanamide, ethyl acetoacetate, gamma-butyrolactone, propylene glycol methyl ether, propylene carbonate, dimethyl adipate, propylene glycol methyl ether acetate, dibasic ester (DBE), dibasic ester 5 (DBE-5), 4-hydroxy-4-methyl-2-pentanone (diacetone alcohol), propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), tripropylene glycol methyl ether, diethylene glycol ethyl ether acetate, or combinations thereof. The trialkyl phosphate may comprise, for example, trimethylphosphate, triethylphosphate, tripropylphosphate, tributylphosphate, or the like.

As discussed above, the organic medium has an evaporation rate less than 10 g/min m², at the dissolution temperature of the fluoropolymer dispersed in the organic medium. Evaporation rates may be measured using ASTM D3539 (1996). According to the present invention, the dissolution temperature of the fluoropolymer dispersed in the organic medium may be determined by measuring complex viscosity of the mixture as a function of temperature. This technique may be applied to fluoropolymers (in addition to other types of polymer) mixed in an organic medium where the total mass of non-volatile solids content of such mixtures is from 44% to 46%, such as 45% of the total mass of the mixture. Complex viscosity may be measured with an Anton-Paar MCR301 rheometer using a 50-millimeter cone and temperature-controlled plate. The complex viscosity of fluoropolymer mixtures is measured over a temperature range from 35° C. to at least 75° C. with a temperature ramp rate of 10° C. per minute, an oscillatory frequency of 1 Hz, and a stress amplitude limit of 90 Pa. The dissolution of fluoropolymer in the organic medium is indicated by a sharp increase in the complex viscosity as temperature increased. The dissolution temperature is defined as the temperature at which the rate of change in viscosity with ramping temperature is highest and is calculated by determining the temperature at which the first derivative with respect to temperature of the $Log_{10}$ of the complex viscosity reaches a maximum. FIG. 1 is a graph illustrating the first derivative of Log₁₀ viscosity versus temperature, wherein the peak maximum is used to determine the dissolution temperature of the fluoropolymer polyvinylidene fluoride (PVDF T-1 from Inner Mongolia 3F Wanhao Fluorochemical Co. Ltd.) dispersed in the organic medium 1,2,3-triacetoxypropane (triacetin) from the abscissa. The table below illustrates dissolution temperatures determined according to this method using PVDF T-1 from Inner Mongolia 3F Wanhao Fluorochemical Co. Ltd. (PVDF T-1 has a particle size of about 330 to 380 nm and a weight average molecular weight of about 130,000 to 160,000 g/mol), in various solvents or solvent mixtures as listed.

(diacetone alcohol), propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), tripropylene glycol methyl ether, diethylene glycol ethyl ether acetate, or combinations thereof. The trialkyl phosphate may comprise, for example, trimethylphosphate, triethylphosphate, tripropylphosphate, tributylphosphate, or the like.

The organic medium may consist essentially of or consist of, for example, butyl pyrrolidone, trialkyl phosphate, 1,2,3-triacetoxypropane, 3-methoxy-N,N-dimethylpropanamide, ethyl acetoacetate, gamma-butyrolactone, cyclohexanone, propylene carbonate, dimethyl adipate, propylene glycol methyl ether acetate, dibasic ester (DBE), dibasic ester 5 (DBE-5), 4-hydroxy-4-methyl-2-pentanone (diacetone alcohol), propylene glycol diacetate, dimethyl phthalate, methyl isoamyl ketone, ethyl propionate, 1-ethoxy-2-propanol, saturated and unsaturated linear and cyclic ketones (commercially available as a mixture thereof as Eastman™ C-11 Ketone from Eastman Chemical Company), diisobutyl ketone, acetate esters (commercially available as Exxate™ 1000 from Hallstar), diethylene glycol ethyl ether acetate, or combinations thereof.

The organic medium may comprise a primary solvent and a co-solvent that form a homogenous continuous phase with the fluoropolymer as the dispersed phase. The primary solvent and co-solvent and relevant amounts thereof may be selected to provide a dispersion of the fluoropolymer in the

| Solvent | Solvent % mass of organic medium | Cosolvent | Cosolvent % mass of organic medium | PVDF % mass of mixture | Dissolution Temp (° C.) | Evaporation rate at Dissolution Temp (mg/min m²) |
|---|---|---|---|---|---|---|
| N-butylpyrrolidone | 100 | — | — | 45 | 48 | — |
| gamma-butyrolactone | 100 | — | — | 45 | 51 | 9.31 |
| Isophorone | 100 | — | — | 45 | 72 | 16.59 |
| Triacetin | 100 | — | — | 45 | 76 | 0.69 |
| Ethyl Acetoacetate | 100 | — | — | 45 | 76 | 37.76 |
| Triethylphosphate | 80 | Ethyl Acetoacetate | 20 | 45 | 46 | — |
| Triethylphosphate | 80 | Dowanol ™ PM[1] | 20 | 45 | 58 | — |

[1]Propylene glycol methyl ether commercially available from The Dow Chemical Company.

The dissolution temperature of the fluoropolymer dispersed in the organic medium may be less than 77° C., such as less than 70° C., such as less than 65° C., such as less than 60° C., such as less than 55° C., such as less than 50° C. The dissolution temperature of the fluoropolymer dispersed in the organic medium may range from 30° C. to 77° C., such as from 30° C. to 70° C., such as 30° C. to 65° C., such as 30° C. to 60° C., such as 30° C. to 55° C., such as 30° C. to 50° C. The dissolution temperature may be measured according to the method discussed above.

The organic medium may comprise, for example, butyl pyrrolidone, trialkyl phosphate, 1,2,3-triacetoxypropane, 3-methoxy-N,N-dimethylpropanamide, ethyl acetoacetate, gamma-butyrolactone, propylene glycol methyl ether, cyclohexanone, propylene carbonate, dimethyl adipate, propylene glycol methyl ether acetate, dibasic ester (DBE), dibasic ester 5 (DBE-5), 4-hydroxy-4-methyl-2-pentanone organic medium at room temperature, i.e., about 23° C. Both the primary solvent and co-solvent may comprise organic solvent(s). The fluoropolymer may be soluble in the primary solvent at room temperature if used alone but use of the co-solvent with the primary solvent may allow for the fluoropolymer to be stably dispersed in the organic medium. The primary solvent may comprise, consist essentially of, or consist of, for example, butyl pyrrolidone, a trialkylphosphate, 3-methoxy-N,N-dimethylpropanamide, 1,2,3-triacetoxypropane, or combinations thereof. The co-solvent may comprise, consist essentially of, or consist of, for example, ethyl acetoacetate, gamma-butyrolactone, and/or glycol ethers such as propylene glycol methyl ether, dipropylene glycol methyl ether, propylene glycol monopropyl ether, diethylene glycol monobutyl ether, ethylene glycol monohexyl ether, and the like. The primary solvent may be present in an amount of at least 50% by weight, such as at least 65% by weight, such as at least 75 by weight, and may be present in an amount of no more than 99% by weight, such as no more than 90% by weight, such as no more than 85% by weight, based on the total weight of the organic medium. The primary solvent may be present in an amount of 50% to 99% by weight, such as 65% to 90% by weight, such as 75% to 85% by weight, based on the total weight of the organic medium. The co-solvent may be present in an amount of at least 1% by weight, such as at least 10% by weight, such as at least 15% by weight, and may be present in an amount of no more than 50% by weight, such as no more than 35% by weight, such as no more than 25% by weight. The co-solvent may be present in an amount of 1% to 50% by weight, such as 10% to 35% by weight, such as 15% to 25% by weight, based on the total weight of the organic medium.

The organic medium may also have an evaporation rate greater than 80 g/min m$^2$, at 180° C., such as greater than 90 g/min m$^2$, at 180° C., such as greater than 100 g/min m$^2$, at 180° C.

The liquid medium may comprise an aqueous medium. As used herein, the term "aqueous medium" refers to a liquid medium comprising at least 50% by weight water, based on the total weight of the organic medium. Such aqueous mediums may comprise less than 40% by weight organic solvent, or less than 30% by weight organic solvent, or less than 20% by weight organic solvent, or less than 10% by weight organic solvent, or less than 5% by weight organic solvent, or less than 1% by weight organic solvent, or less than 0.1% by weight organic solvent, based on the total weight of the aqueous medium. Water may comprise more than 50% by weight of the aqueous medium, such as at least 60% by weight, such as at least 70% by weight, such as at least 80% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 90% to 100% by weight, such as 95% to 100% by weight, such as 99% to 100% by weight, such as 99.9% to 100% by weight, based on the total weight of the aqueous medium.

The liquid medium may be present in an amount of at least 10% by weight, such as at least 15% by weight, such as at least 20% by weight, such as at least 30% by weight, such as at least 35% by weight, such as at least 40% by weight, and may be present in an amount of no more than 80% by weight, such as no more than 70% by weight, such as no more than 60% by weight, such as no more than 50% by weight, such as no more than 45% by weight, such as no more than 45% by weight, such as no more than 40% by weight, such as no more than 35% by weight, such as no more than 29% by weight, such as no more than 25% by weight, based on the total weight of the slurry composition. The liquid medium may be present in an amount of such as 20% to 80% by weight, 10% to 70% by weight, such as 30% to 70% by weight, such as 35% to 60% by weight, such as 40% to 50% by weight, 15% to 60% by weight, 15% to 50% by weight, 15% to 45% by weight, 15% to 40% by weight, 15% to 35% by weight, 15% to 29% by weight, 15% to 25% by weight, based on the total weight of the slurry composition.

The slurry composition may be substantially free, essentially free, or completely free of N-Methyl-2-pyrrolidone (NMP). As used herein, the slurry composition is "substantially free" of NMP if NMP is present, if at all, in an amount of less than 5% by weight, based on the total weight of the slurry composition. As used herein, the slurry composition is "essentially free" of NMP if NMP is present, if at all, in an amount of less than 0.3% by weight, based on the total weight of the slurry composition. As used herein, the slurry composition is "completely free" of NMP if NMP is not present in the slurry composition, i.e., 0.0% by weight, based on the total weight of the slurry composition.

The slurry composition may be substantially free, essentially free, or completely free of ketones such as methyl ethyl ketone, cyclohexanone, isophorone, acetophenone.

The slurry composition may be substantially free, essentially free, or completely free of ethers such as the $C_1$ to $C_4$ alkyl ethers of ethylene or propylene glycol.

The slurry composition further comprises an adhesion promoter. The adhesion promoter may comprise a polyvinylidene fluoride copolymer different than the fluoropolymer described above, an acid-functional polyolefin, or a thermoplastic material.

The polyvinylidene fluoride copolymer adhesion promoter comprises constitutional units comprising the residue of vinylidene fluoride and at least one of (i) a (meth)acrylic acid; and/or (ii) a hydroxyalkyl (meth)acrylate. The (meth)acrylic acid may comprise acrylic acid, methacrylic acid, or combinations thereof. The hydroxyalkyl (meth)acrylate may comprise a $C_1$ to $C_5$ hydroxyalkyl (meth)acrylate, such as, for example, hydroxyethyl (meth)acrylate, 2-hydroxypropyl (meth)acrylate, 2-hydroxybutyl (meth)acrylate, or combinations thereof. The polyvinylidene fluoride copolymer adhesion promoter comprises at least 50% by moles of constitutional units comprising the residue of vinylidene fluoride, such as at least 70% by moles, such as at least 80% by moles and no more than 99% by moles, such as no more than 98% by moles, such as no more than 95% by moles, based on the total molar content of the polyvinylidene fluoride copolymer adhesion promoter. The polyvinylidene fluoride copolymer adhesion promoter comprises 50% to 99% by moles of constitutional units comprising the residue of vinylidene fluoride, such as 70% to 98% by moles, such as 80% to 95% by moles, based on the total molar content of the polyvinylidene fluoride copolymer adhesion promoter. The polyvinylidene fluoride copolymer adhesion promoter may comprise at least 0.01% by moles of constitutional units comprising the residue of the (meth)acrylic acid, such as at least 0.02% by moles, such as at least 0.03% by moles, and may comprise no more than 10% by moles, such as no more than 5% by moles, such as no more than 2% by moles, based on the total molar content of the polyvinylidene fluoride copolymer adhesion promoter. The polyvinylidene fluoride copolymer adhesion promoter may comprise 0.01% to 10% by moles of constitutional units comprising the residue of the (meth)acrylic acid, such as 0.02% to 5% by moles, such as 0.03% to 2% by moles, based on the total molar content of the polyvinylidene fluoride copolymer adhesion promoter. The polyvinylidene fluoride copolymer adhesion promoter may comprise at least 0.01% by moles of constitutional units comprising the residue of the hydroxyalkyl (meth)acrylate, such as at least 0.02% by moles, such as at least by moles, and may comprise no more than 10% by moles, such as no more than 5% by moles, such as no more than 2% by moles, based on the total molar content of the polyvinylidene fluoride copolymer adhesion promoter. The polyvinylidene fluoride copolymer adhesion promoter may comprise 0.01% to 10% by moles of constitutional units comprising the residue of the hydroxyalkyl (meth)acrylate, such as 0.02% to 5% by moles, such as 0.03% to 2% by moles, based on the total molar content of the polyvinylidene fluoride copolymer adhesion promoter. A commercially available example of such an addition polymer includes SOLEF 5130, available from Solvay. Unlike the fluoropolymer discussed above, the polyvinylidene fluoride copolymer may be dispersed or solubilized in the organic medium of the slurry composition.

The acid-functional polyolefin adhesion promoter comprises an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the slurry composition in an amount of 10% to 60% by weight, such as 20% to 60% by weight, such as 30% to 60% by weight, such as 10% to 50% by weight, such as 15% to 40% by weight, such as 20% to 30% by weight, such as 35% to 35% by weight, based on the total weight of the binder solids (including the adhesion promoter).

The slurry composition may optionally further comprise a dispersant. The dispersant may assist in dispersing the fluoropolymer, and/or, if present, the electrically conductive agent and/or the electrochemically active material in the liquid medium. When present, the dispersant may be a component of the slurry composition binder. The dispersant may comprise at least one phase that is compatible with the fluoropolymer and/or other components of the slurry composition, such as the electrically conductive agent or electrochemically active material, if present, and may further comprise at least one phase that is compatible with the liquid medium. The slurry composition may comprise one, two, three, four or more different dispersants, and each dispersant may assist in dispersing a different component of the slurry composition. The dispersant may comprise any material having phases compatible with both the fluoropolymer and/or, if present, the electrically conductive agent or electrochemically active material, and the liquid medium. As used herein, the term "compatible" means the ability of a material to form a blend with other materials that is and will remain substantially homogenous over time. The fluoropolymer and dispersant may not be bound by a covalent bond. For example, the dispersant may comprise a polymer comprising such phases. The polymer may be in the form of a block polymer, a random polymer, or a gradient polymer, wherein the phases of present in the different blocks of the polymer, are randomly included throughout the polymer, or are progressively more or less densely present along the polymer backbone, respectively. The dispersant may comprise any suitable polymer to serve this purpose. For example, the polymer may comprise addition polymers produced by polymerizing ethylenically unsaturated monomers, polyepoxide polymers, polyamide polymers, polyurethane polymers, polyurea polymers, polyether polymers, polyacid polymers, and polyester polymers, among others. The dispersant may also serve as an additional component of the binder of the slurry composition.

The dispersant may comprise functional groups. The functional groups may comprise, for example, active hydrogen functional groups, heterocyclic groups, and combinations thereof. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, carboxylic acid groups, and thiol groups. As used herein, the term "heterocyclic group" refers to a cyclic group containing at least two different elements in its ring such as a cyclic moiety having at least one atom in addition to carbon in the ring structure, such as, for example, oxygen, nitrogen or sulfur. Non-limiting examples of heterocylic groups include epoxides, lactams and lactones. In addition, when epoxide functional groups are present on the addition polymer, the epoxide functional groups on the dispersant may be post-reacted with a beta-hydroxy functional acid. Non-limiting examples of beta-hydroxy functional acids include citric acid, tartaric acid, and/or an aromatic acid, such as 3-hydroxy-2-naphthoic acid. The ring opening reaction of the epoxide functional group will yield hydroxyl functional groups on the dispersant.

When acid functional groups are present, the dispersant may have a theoretical acid equivalent weight of at least 350 g/acid equivalent, such as at least 878 g/acid equivalent, such as at least 1,757 g/acid equivalent, and may be no more than 17,570 g/acid equivalent, such as no more than 12,000 g/acid equivalent, such as no more than 7,000 g/acid equivalent. The dispersant may have a theoretical acid equivalent weight of 350 to 17,570 g/acid equivalent, such as 878 to 12,000 g/acid equivalent, such as 1,757 to 7,000 g/acid equivalent.

As mentioned above, the dispersant may comprise an addition polymer. The addition polymer may be derived from, and comprise constitutional units comprising the residue of, one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The reaction mixture may additionally comprise other ethylenically unsaturated monomers such as alkyl esters of (meth)acrylic acid and others described below.

The addition polymer may comprise a (meth)acrylic polymer that comprises constitutional units comprising the residue of one or more (meth)acrylic monomers. The (meth)acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise at least 1% by weight, such as at least 2% by weight, such as at least 5% by weight, and may be no more than 50% by weight, such as no more than 20% by weight, such as no more than 10% by weight, such as no more than 5% by weight, based on the total weight of the addition polymer. The constitutional units comprising the residue of the alpha, beta-ethylenically unsaturated carboxylic acids may comprise 1% to 50% by weight, 2% to 50% by weight, such as 2% to 20% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of an alpha, beta-ethylenically unsaturated carboxylic acids in the dispersant results in a dispersant comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise at least 20% by weight, such as at least 30% by weight, such as at least 40% by weight, such as at least 45% by weight, such as at least 50% by weight, and may be no more than 98% by weight, such as no more than 96% by weight, such as no more than 90% by weight, such as no more than 80% by weight, such as no more than 75% by weight, based on the total weight of the addition polymer. The constitutional units comprising the residue of the alkyl esters of (meth)acrylic acid containing from 1 to 3 carbon atoms in the alkyl group may comprise 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 20% to 98% by weight, such as 30% to 96% by weight, such as 30% to 90% by weight, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise at least 2% by weight, such as at least 5% by weight, such as at least 10% by weight, such as at least 15% by weight, such as at least 20% by weight, and may be no more than 70% by weight, such as no more than 60% by weight, such as no more than 50% by weight, such as no more than 40% by weight, such as no more than 35% by weight, based on the total weight of the addition polymer. The constitutional units comprising the residue of the alkyl esters of (meth)acrylic acid containing from 4 to 18 carbon atoms in the alkyl group may comprise 2% to 70% by weight, such as 2% to 60% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

The addition polymer may comprise constitutional units comprising the residue of an ethylenically unsaturated monomer comprising a heterocyclic group. Non-limiting examples of ethylenically unsaturated monomers comprising a heterocyclic group include epoxy functional ethylenically unsaturated monomers, such as glycidyl (meth)acrylate, vinyl pyrrolidone and vinyl caprolactam, among others. The constitutional units comprising the residue of the ethylenically unsaturated monomers comprising a heterocyclic group may comprise at least 0.5% by weight, such as at least 1% by weight, such as at least 5% by weight, such as at least 8% by weight, and may be no more than 99% by weight, such as no more than 50% by weight, such as no more than 40% by weight, such as no more than 30% by weight, such as no more than 27% by weight, based on the total weight of the addition polymer. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, 8% to 27% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, 8% to 27% by weight, based on the total weight of polymerizable monomers used in the reaction mixture.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the dispersant to a crosslink between the dispersant or more than one dispersant. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactone and methylethyl ketoxime. The constitutional units comprising the residue of the self-crosslinking monomer may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the self-crosslinking monomer may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other alpha, beta-ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymers may be prepared by conventional free radical initiated solution polymerization techniques in which the polymerizable monomers are dissolved in a second organic medium comprising a solvent or a mixture of solvents and polymerized in the presence of a free radical initiator until conversion is complete. The second organic medium used to prepare the addition polymer may be the same as the organic medium present in the slurry composition such that the composition of the organic medium is unchanged by addition of the addition polymer solution. For example, the second organic medium may comprise the same primary solvent(s) and co-solvent(s) in the same ratios as the organic medium of the slurry composition. Alternatively, the second organic medium used to prepare the addition polymer may be different and distinct from the organic medium of the slurry composition. The second organic medium used to produce the addition polymer may comprise any suitable organic solvent or mixture of solvents, including those discussed above with respect to the organic medium, such as, for example, triethylphosphate.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the slurry composition of the invention, the dispersants prepared as described above usually have a weight average molecular weight of about 5000 to 500,000 g/mol, such as 10,000 to 100,000 g/mol, and 25,000 to 50,000 g/mol.

The dispersant may be present in the binder in amounts of 2% to 20% by weight, such as 5% to 15% by weight, based on the total weight of the binder solids.

As noted above, the slurry composition may optionally further comprise a separately added crosslinking agent for reaction with the dispersant. The crosslinking agent should be soluble or dispersible in the liquid medium and be reactive with active hydrogen groups of the dispersant, such as the carboxylic acid groups and the hydroxyl groups, if present. Non-limiting examples of suitable crosslinking agents include aminoplast resins, blocked polyisocyanates and polyepoxides.

Examples of aminoplast resins for use as a crosslinking agent are those which are formed by reacting a triazine such as melamine or benzoguanamine with formaldehyde. These reaction products contain reactive N-methylol groups. Usually, these reactive groups are etherified with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactone and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

In addition to promoting the crosslinking of the dispersant, the crosslinking agents, including those associated with crosslinking monomers and separately added crosslinking agents, react with the hydrophilic groups, such as active hydrogen functional groups of the dispersant preventing these groups from absorbing moisture that could be problematic in a lithium ion battery.

The separately added crosslinker may be present in the binder in amounts of up to 15% by weight, such as 1% to 15% by weight, the % by weight being based on the total weight of the binder solids.

The binder typically has a resin solids content of from 30% to 80% by weight, such as 40% to 70% by weight, based on the total weight of the binder dispersion. As used herein, the term "resin solids" may be used synonymously with "binder solids" and include the fluoropolymer, adhesion promoter, and, if present, the dispersant, and separately added crosslinking agent. As used herein, the term "binder dispersion" refers to a dispersion of the binder solids in the liquid medium. The fluoropolymer may be present in in the binder in amounts of 40% to 96% by weight, such as 50% to 90% by weight; the adhesion promoter may be present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight; the dispersant may be present in amounts of 2% to 20% by weight, such as 5% to 15% by weight; and the separately added crosslinker may be present in amounts of up to 15% by weight, such as 1% to 15% by weight, the % by weight being based on the total weight of the binder solids. The liquid medium is present in the binder dispersion in amounts of 20% to 70% by weight, such as 30% to 60% by weight, based on total weight of the binder dispersion.

The binder solids may be present in the slurry in amounts of 1% to 20% by weight, such as 1% to 10% by weight, such as 5% to 10% percent by weight, based on the total solids weight of the slurry.

The slurry composition of the present invention may optionally further comprise an electrically conductive agent. Non-limiting examples of electrically conductive agents include carbonaceous materials such as, activated carbon, carbon black such as acetylene black and furnace black, graphite, graphene, carbon nanotubes, carbon fibers, fullerene, and combinations thereof. The electrically conductive material may also comprise any active carbon that has a high-surface area, such as a BET surface area of greater than 100 m$^2$/g. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 m$^2$/g to 1,000 m$^2$/g, such as 150 m$^2$/g to 600 m$^2$/g, such as 100 m$^2$/g to 400 m$^2$/g, such as 200 m$^2$/g to 400 m$^2$/g. In some examples, the conductive carbon can have a BET surface area of about 200 m$^2$/g. A suitable conductive carbon material is LITX 200 commercially available from Cabot Corporation. The conductive carbon material can be present in the slurry in amounts of 2 to 20, typically 5 to 10 percent by weight based on total solids weight of the slurry.

The electrically conductive agent may be present in the slurry in amounts of 1% to 20% by weight, such as 5% to 10% by weight, based on the total solids weight of the slurry.

The slurry composition may be in the form of an electrode slurry composition comprising the binder, electrochemically active material and electrically conductive material, each as described above. The electrode slurry may comprise such materials present in the slurry composition in the amounts described above. For example, the electrode slurry composition may comprise the electrochemically active material present in amounts of 45% to 95% by weight, such as 70% to 98% by weight; the binder present in amounts of 1% to 20% by weight, such as 1% to 10% by weight, such as 5% to 10% percent by weight; and the electrically conductive agent present in amounts of 1% to 20% by weight, such as 5% to 10% by weight, the percentages by weight based on the total solids weight of the electrode slurry composition.

The electrode slurry composition comprising the liquid medium, electrochemically active material, electrically conductive material, binder dispersion (which may include a separately added crosslinking agent), additional liquid medium, if needed, and optional ingredients, may be prepared by combining the ingredients to form the slurry. These substances can be mixed together by agitation with a known means such as a stirrer, bead mill or high-pressure homogenizer.

As for mixing and agitation for the manufacture of the electrode slurry composition, a mixer capable of stirring these components to such an extent that satisfactory dispersion conditions are met should be selected. The degree of dispersion can be measured with a particle gauge and mixing and dispersion are preferably carried out to ensure that agglomerates of 100 microns or more are not present. Examples of the mixers which meet this condition include ball mill, sand mill, pigment disperser, grinding machine, extruder, rotor stator, pug mill, ultrasonic disperser, homogenizer, planetary mixer, Hobart mixer, and combinations thereof.

The slurry composition may have a solids content of at least 30% by weight, such as at least 40% by weight, such as at least 50% by weight, such as at least 55%, such as at least 60%, such as at least 65%, such as at least 71%, such as at least 75%, and may be no more than 90% by weight, such as no more than 85% by weight, such as no more than 75% by weight, the % by weight based on the total weight of the slurry composition. The slurry composition may have a solids content of 30% to 90% by weight, such as 40% to 85% by weight, such as 50% to 85% by weight, such as 55% to 85% by weight, such as 60% to 85% by weight, such as 65% to 85% by weight, such as 71% to 85% by weight, such as 75% to 85% by weight, based on the total weight of the slurry composition.

The present invention is also directed to an electrode comprising an electrical current collector and a film formed on the electrical current collector, wherein the film is deposited from the electrode slurry composition described above. The electrode may be a positive electrode or a negative electrode and may be manufactured by applying the above-described slurry composition to the surface of the current collector to form a coating film, and subsequently drying and/or curing the coating film. The coating film may have a thickness of at least 1 micron, such as 1 to 500 microns (µm), such as 1 to 150 µm, such as 25 to 150 µm, such as 30 to 125 µm. The coating film may comprise a crosslinked coating. The current collector may comprise a conductive material, and the conductive material may comprise a metal such as iron, copper, aluminum, nickel, and alloys thereof, as well as stainless steel. For example, the current collector may comprise aluminum or copper in the form of a mesh, sheet or foil. Although the shape and thickness of the current collector are not particularly limited, the current collector may have a thickness of about 0.001 to 0.5 mm, such as a mesh, sheet or foil having a thickness of about 0.001 to 0.5 mm.

The coating film produced from the slurry composition of the present invention may possess improved adhesion to the current collector compared to a coating film produced from a slurry composition that does not include the adhesion promoter of the present invention. For example, the use of the coating film resulting from the slurry composition of the present invention may improve adhesion by at least 50%, such as at least 100%, such as at least 200%, such as at least 300%, such as at least 400%, compared to a coating film produced from a slurry composition that does not include the adhesion promoter of the present invention. As used herein, the term "adhesion" refers to peel strength adhesion as measured by the PEEL STRENGTH TEST METHOD. According to the PEEL STRENGTH TEST METHOD, adhesion is measured using a motorized test stand (EMS-303, available from Mark-10) equipped with a 10 N force gauge (Series 5, Model M5-2) and a 90° peel stage. The lateral movement of the 90° peel stage is actively driven at the same rate as the vertical movement of the test stand crosshead, which ensures a 90° peel angle throughout the entire measurement. A coating on aluminum foil, prepared as described in the Examples section below, is cut into rectangular strips (1.1 inches wide by 11 inches long). The coated side of the strips are adhered to a rigid aluminum substrate using 3M 444 double-sided tape (1 inch wide by 7 inches long), leaving a free end of the foil that was not taped down. The rigid aluminum substrate is then fastened to the peel stage, and the free end of the foil is secured in the peel stage grips such that a 90° angle is achieved between the instrument crosshead and the peel stage. The samples are then peeled at a rate of 50 mm/min for 2 min.

The current collector may be pretreated with a pretreatment composition prior to depositing the slurry composition. As used herein, the term "pretreatment composition" refers to a composition that upon contact with the current collector, reacts with and chemically alters the current collector surface and binds to it to form a protective layer. The pretreatment composition may be a pretreatment composition comprising a group IIIB and/or IVB metal. As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. Suitable pretreatment compositions and methods for pretreating the current collector are described in U.S. Pat. No. 9,273,399 at col. 4, line 60 to col. 10, line 26, the cited portion of which is incorporated herein by reference. The pretreatment composition may be used to treat current collectors used to produce positive electrodes or negative electrodes.

The method of applying the slurry composition to the current collector is not particularly limited. The slurry composition may be applied by doctor blade coating, dip coating, reverse roll coating, direct roll coating, gravure coating, extrusion coating, immersion or brushing. Although the application quantity of the slurry composition is not particularly limited, the thickness of the coating formed after the liquid medium is removed may be 25 to 150 microns (µm), such as 30 to 125 µm.

Drying and/or crosslinking the coating film after application, if applicable, can be done, for example, by heating at elevated temperature, such as at least 50° C., such as at least 60° C., such as 50-145° C., such as 60-120° C., such as 65-110° C. The time of heating will depend somewhat on the temperature. Generally, higher temperatures require less time for curing. Typically, curing times are for at least 5 minutes, such as 5 to 60 minutes. The temperature and time should be sufficient such that the dispersant in the cured film is crosslinked (if applicable), that is, covalent bonds are formed between co-reactive groups on the dispersant polymer chain, such as carboxylic acid groups and hydroxyl groups and the N-methylol and/or the N-methylol ether groups of an aminoplast, isocyanato groups of a blocked polyisocyanate crosslinking agent, or in the case of a self-curing dispersant, the N-alkoxymethyl amide groups or blocked isocyanato groups. The extent of cure or crosslinking may be measured as resistance to solvents such as methyl ethyl ketone (MEK). The test is performed as described in ASTM D-540293. The number of double rubs, one back and forth motion, is reported. This test is often referred to as "MEK Resistance". Accordingly, the dispersant and crosslinking agent (inclusive of self-curing dispersants and dispersants with separately added crosslinking agents) is isolated from the binder composition, deposited as a film and heated for the temperature and time that the binder film is heated. The film is then measured for MEK Resistance with the number of double rubs reported. Accordingly, a crosslinked dispersant will have an MEK Resistance of at least 50 double rubs, such as at least 75 double rubs. Also, the crosslinked dispersant may be substantially solvent resistant to the solvents of the electrolyte mentioned below. Other methods of drying the coating film include ambient temperature drying, microwave drying and infrared drying, and other methods of curing the coating film include e-beam curing and UV curing.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

The present invention is also directed to an electrical storage device. An electrical storage device according to the present invention can be manufactured by using the above electrodes prepared from the electrode slurry composition of the present invention. The electrical storage device comprises an electrode, a counter electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator there between, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiBloCl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as α-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" as used herein is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the slurry composition.

As used herein, unless otherwise defined, the term essentially free means that the component is present, if at all, in an amount of less than 1% by weight, based on the total weight of the slurry composition.

As used herein, unless otherwise defined, the term completely free means that the component is not present in the slurry composition, i.e., 0.00% by weight, based on the total weight of the slurry composition.

As used herein, the term "total solids" refers to the non-volatile components of the slurry composition of the present invention and specifically excludes the liquid medium.

As used herein, the term "consists essentially of" includes the recited material or steps and those that do not materially affect the basic and novel characteristics of the claimed invention.

As used herein, the term "consists of" excludes any element, step or ingredient not recited.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" electrochemically active material, "a" fluoropolymer, "a" dispersant, and "an" electrically conductive agent, "an" adhesion promoter, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described. Although various embodiments of the invention have been described in terms of "comprising", embodiments consisting essentially of or consisting of are also within the scope of the present invention.

As used herein, the terms "on," "onto," "applied on," "applied onto," "formed on," "deposited on," "deposited onto," mean formed, overlaid, deposited, or provided on but not necessarily in contact with the surface. For example, a composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

Each of the characteristics and examples described above, and combinations thereof, may be said to be encompassed by the present invention. The present invention is thus drawn in particular, without being limited thereto, to the following aspects:

1. A slurry composition comprising:
   (a) a binder comprising a polymer comprising a fluoropolymer dispersed in a liquid medium;
   (b) an adhesion promoter; and at least one of
   (c1) an electrochemically active material, and
   (c2) an electrically conductive agent.

2. The slurry composition of Aspect 1, wherein the adhesion promoter comprises a polyvinylidene fluoride copolymer different from the fluoropolymer of the binder.

3. The slurry composition of Aspect 2, wherein the polyvinylidene fluoride copolymer comprises constitutional units comprising the residue of vinylidene fluoride and at least one of:
   (i) (meth)acrylic acid; or
   (ii) hydroxyalkyl (meth)acrylate.

4. The slurry composition of Aspect 3, wherein the (meth)acrylic acid comprises acrylic acid.

5. The slurry composition of Aspect 3 or 4, wherein the hydroxyalkyl (meth)acrylate comprises a $C_1$ to $C_5$ hydroxyalkyl (meth)acrylate.

6. The slurry composition of Aspect 5, wherein the $C_1$ to $C_5$ hydroxyalkyl (meth)acrylate comprises hydroxyethyl (meth)acrylate, 2-hydroxypropyl (meth)acrylate, 2-hydroxybutyl (meth)acrylate, or combinations thereof.

7. The slurry composition of Aspects 3 to 6, wherein the adhesion promoter comprises 50% to 99% by moles of constitutional units comprising the residue of vinylidene fluoride, such as 70% to 98% by moles, such as 80% to 95% by moles; and 0.01% to 10% by moles of constitutional units comprising the residue of the (meth)acrylic acid, such as 0.02% to 5% by moles, such as 0.03% to 2% by moles, based on the total molar content of the polyvinylidene fluoride copolymer adhesion promoter.

8. The slurry composition of Aspects 3 to 6, wherein the adhesion promoter comprises 50% to 99% by moles of constitutional units comprising the residue of vinylidene fluoride, such as 70% to 98% by moles, such as 80% to 95% by moles; and 0.01% to 10% by moles of constitutional units comprising the residue of the hydroxyalkyl (meth)acrylate, such as to 5% by moles, such as 0.03% to 2% by moles, based on the total molar content of the polyvinylidene fluoride copolymer adhesion promoter.

9. The slurry composition of Aspects 3 to 6, wherein the adhesion promoter comprises 50% to 99% by moles of constitutional units comprising the residue of vinylidene fluoride, such as 70% to 98% by moles, such as 80% to 95% by moles; 0.01% to 10% by moles of constitutional units comprising the residue of the (meth)acrylic acid, such as 0.02% to 5% by moles, such as 0.03% to 2% by moles; and 0.01% to 10% by moles of constitutional units comprising the residue of the hydroxyalkyl (meth)acrylate, such as 0.02% to 5% by moles, such as 0.03% to 2% by moles, based on the total molar content of the polyvinylidene fluoride copolymer adhesion promoter.

The slurry composition of any of Aspects 2 to 9, wherein the liquid medium comprises an organic medium.

11. The slurry composition of Aspect 10, wherein the organic medium has an evaporation rate less than 10 g/min m$^2$, at the dissolution temperature of the fluoropolymer in the organic medium.

12. The slurry composition of Aspect 10 or 11, wherein the organic medium has an evaporation rate greater than 80 g/min m$^2$, at 180° C.

13. The slurry composition of any one of Aspects 2 to 12, wherein the organic medium comprises butyl pyrrolidone, trialkyl phosphate such as triethylphosphate, 1,2,3-triacetoxypropane, 3-methoxy-N,N-dimethylpropanamide, ethyl acetoacetate, gamma-butyrolactone, propylene glycol methyl ether, cyclohexanone, propylene carbonate, dimethyl adipate, propylene glycol methyl ether acetate, dibasic ester (DBE), dibasic ester 5, 4-hydroxy-4-methyl-2-pentanone, propylene glycol diacetate, dimethyl phthalate, methyl isoamyl ketone, ethyl propionate, 1-ethoxy-2-propanol, dipropylene glycol dimethyl ether, saturated and unsaturated linear and cyclic ketones, diisobutyl ketone, acetate esters, tripropylene glycol methyl ether, diethylene glycol ethyl ether acetate, or combinations thereof.

14. The slurry composition of any one of Aspects 2 to 13, wherein the organic medium comprises a primary solvent and a co-solvent, the primary solvent comprising butyl pyrrolidone, a trialkylphosphate such as triethylphosphate, 3-methoxy-N,N-dimethylpropanamide, 1,2,3-triacetoxypropane, or combinations thereof, and the co-solvent comprising ethyl acetoacetate, gamma-butyrolactone, propylene glycol methyl ether, dipropylene glycol methyl ether, propylene glycol monopropyl ether, diethylene glycol monobutyl ether, ethylene glycol monohexyl ether, or combinations thereof.

15. The slurry composition of Aspect 14, wherein the primary solvent is present in an amount of 50% to 99% by weight, such as 65% to 90% by weight, such as 75% to 85% by weight, and the co-solvent is present in an amount of 1% to 50% by weight, such as 10% to 35% by weight, such as 15% to 25% by weight, each based on the total weight of the organic medium.

16. The slurry composition of any of one of Aspects 13 to 15, where the organic medium comprises triethyl phosphate.

17. The slurry composition of Aspect 14 or 15, wherein the organic medium comprises triethyl phosphate as the primary solvent and ethyl acetoacetate as a co-solvent.

18. The slurry composition of Aspect 1, wherein the adhesion promoter comprises an acid-functional polyolefin.

19. The slurry composition of Aspect 18, wherein the acid-functional polyolefin comprises an ethylene-acrylic acid copolymer.

20. The slurry composition of Aspect 19, wherein the ethylene-acrylic acid copolymer comprises constitutional units comprising 20% by weight acrylic acid, based on the total weight of the ethylene-acrylic acid copolymer.

21. The slurry composition of any one of Aspects 18 to 20, wherein the liquid medium comprises an aqueous medium.

22. The slurry composition of any one of Aspects 1 to 21, wherein the electrically conductive agent comprises graphite, carbon black such as acetylene black and furnace black, graphene, carbon nanotubes, or combinations thereof.

23. The slurry composition of any one of Aspects 1 to 21, wherein the electrically conductive agent comprises conductive carbon material having a BET surface area of 100 m$^2$/g to 1000 m$^2$/g.

24. The slurry composition of any one of Aspects 1 to 23, wherein the slurry is substantially free of isophorone.

25. The slurry composition of any one of Aspects 1 to 24, wherein the slurry is substantially free of N-methyl-2-pyrrolidone.

26. The slurry composition of any of the preceding Aspects, wherein the binder solids are present in the slurry composition in amounts of 1% to 20% by weight, such as 1% to 10% by weight, such as 5% to 10% percent by weight, based on the total solids weight of the slurry, based on the total solids weight of the slurry.

27. The slurry composition of any one of Aspects 1 to 25, wherein the adhesion promoter is present in the slurry composition in an amount of 10% to 60% by weight, such as 20% to 60% by weight, such as 30% to 60% by weight, such as 10% to 50% by weight, such as 15% to 40% by weight, such as 20% to 30% by weight, or such as 35% to 35% by weight, based on the total weight of the binder solids.

28. The slurry composition of any one of Aspects 1 to 25, wherein the binder solids are present in the slurry composition in amounts of 1% to 20% by weight, such as 1% to 10% by weight, such as 5% to 10% percent by weight, based on the total solids weight of the slurry, and the fluoropolymer is present in the binder in amounts of 40% to 96% by weight, such as 50% to 90% by weight; the dispersant is present in amounts of 2% to 20% by weight, such as 5% to 15% by weight; and the adhesion promoter is present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight, the % by weight being based on the total weight of the binder solids.

29. The slurry composition of any one of Aspects 1 to 25, wherein the binder solids are present in the slurry composition in amounts of 1% to 20% by weight, such as 1% to 10% by weight, such as 5% to 10% percent by weight, based on the total solids weight of the slurry, and the fluoropolymer is present in the binder in amounts of 40% to 96% by weight, such as 50% to 90% by weight; the dispersant is present in amounts of 2% to 20% by weight, such as 5% to 15% by weight; the adhesion promoter is present in the slurry composition in an amount of 10% to 60% by weight, 20% to 60% by weight, such as 30% to 60% by weight, such as 10% to 50% by weight, such as 15% to 40% by weight, such as 20% to 30% by weight, such as 35% to 35% by weight; and the separately added crosslinker may be present in amounts of up to 15% by weight, such as 1% to 15% by weight, the % by weight being based on the total weight of the binder solids.

30. The slurry composition of any of the preceding Aspects, wherein the electrochemically active material comprises a material capable of incorporating lithium.

31. The slurry composition of Aspect 30, wherein material capable of incorporating lithium comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.

32. The slurry composition of any of Aspects 1 to 29, wherein the electrochemically active material comprises a material capable of lithium conversion.

33. The slurry composition of Aspect 32, wherein the material capable of lithium conversion comprises sulfur, $LiO_2$, $FeF_2$ and $FeF_3$, Si, aluminum, tin, SnCo, $Fe_3O_4$, or combinations thereof.

34. The slurry composition of any of Aspects 1 to 29, wherein the electrochemically active material comprises graphite, silicon compounds, tin, tin compounds, sulfur, sulfur compounds, or a combination thereof.

35. The slurry composition of any of the preceding Aspects, wherein the electrochemically active material is present in the slurry composition in amounts of 45% to 95% by weight, such as 70% to 98% by weight, based on the total solids weight of the slurry.

36. The slurry composition of any of the preceding Aspects, wherein the electrically conductive agent is present in the slurry composition in amounts of 1% to 20% by weight, such as 5% to 10% by weight, based on the total solids weight of the slurry.

37. An electrode comprising:
(a) an electrical current collector; and
(b) a film formed on the electrical current collector, wherein the film is deposited from the slurry composition of any one of the preceding Aspects.

38. The electrode of Aspect 37, wherein the electrical current collector (a) comprises copper or aluminum in the form of a mesh, sheet or foil.

39. The electrode of Aspects 37 or 38, wherein the electrode comprises a positive electrode.

40. The electrode of Aspects 37 or 38, wherein the electrode comprises a negative electrode.

41. The electrode of any one of Aspects 37 to 40, wherein the film is crosslinked.

42. The electrode of any one of Aspects 37 to 41, wherein the electrical current collector is pretreated with a pretreatment composition.

43. The electrode of any one of Aspect 37 to 42, wherein the film has a thickness of at least 1 µm, such as 1 to 500 µm, such as 1 to 150 µm, such as 25 to 150 µm, such as 30 to 125 µm.

44. An electrical storage device comprising:
(a) the electrode of any one of Aspects 37 to 43;
(b) a counter electrode; and
(c) an electrolyte.

45. The electrical storage device of Aspect 44, wherein the electrolyte (c) comprises a lithium salt dissolved in a solvent.

46. The electrical storage device of Aspect 45, wherein the lithium salt is dissolved in an organic carbonate.

47. The electrical storage device of any one of Aspects 44 to 46, wherein the electrical storage device comprises a cell.

48. The electrical storage device of any one of Aspects 44 to 46, wherein the electrical storage device comprises a battery pack.

49. The electrical storage device of any one of Aspects 44 to 46, wherein the electrical storage device comprises a secondary battery.

50. The electrical storage device of any one of Aspects 44 to 46, wherein the electrical storage device comprises a capacitor.

51. The electrical storage device of any one of Aspects 44 to 46, wherein the electrical storage device comprises a supercapacitor.

Illustrating the invention are the following examples, which, however, are not to be considered as limiting the invention to their details. Unless otherwise indicated, all parts and percentages in the following examples, as well as throughout the specification, are by weight.

EXAMPLES

Example 1. Synthesis of a (Meth)Acrylic Copolymer Dispersant with Theoretical Glass Transition (Tg) of 3.5° C.

|  | Ingredients | Amount (gram) |
|---|---|---|
| Charge 1: | diacetone alcohol | 280 |
| Charge 2: | t-amyl peroctoate | 6.54 |
| (premixed) | diacetone alcohol | 116.8 |
| Charge 3: | methyl methacrylate | 207.5 |
| (premixed) | ethyl acrylate | 194.5 |
|  | methacrylic acid | 54.5 |
|  | butyl acrylate | 215 |
| Charge 4: | diacetone alcohol | 33.5 |
| Charge 5: | t-amyl peroctoate | 2.0 |
| (premixed) | diacetone alcohol | 36 |
| Charge 6: | diacetone alcohol | 16 |
| Charge 7: | dimethyl ethanol amine | 60.2 |
| Charge 8: | 70° C. deionized water | 1695.5 |

To a suitable reaction vessel equipped with a stirrer, reflux condenser, thermometer, heating mantle and nitrogen inlet, Charge 1 was added at ambient temperature. The temperature was then increased to a set-point of 122° C., at which time the initiator premix of Charge 2 was added over 210 minutes and Charge 3 was added over 180 minutes. Upon completion of the addition of Charge 2, Charge 4 was added and the reaction vessel was held for minutes at a set point of 122° C. Charge 5 was then added over 30 minutes, followed by the addition of Charge 6 and an additional 90-minute hold at a set point of 122° C. After cooling to below 100° C., Charge 7 was added over 10 minutes and stifling was continued for 15 minutes before Charge 8 was added over 90 minutes. Thereafter the reaction temperature was cooled to 50° C. The dispersant composition thus formed had a theoretical solids content of 23.25% by weight.

Solids contents of dispersant compositions were measured in each dispersant example by the following procedure. An aluminum weighing dish from Fisher Scientific, was weighed using an analytical balance. The weight of the empty dish was recorded to four decimal places. Approximately 0.5 g of dispersant and 3.5 g of acetone was added to the weigh dish. The weight of the dish and the dispersant solution was recorded to four decimal places. The dish containing the dispersant solution was placed into a laboratory oven, with the oven temperature set to 110° C., and dried for 1 hour. The weigh dish and dried dispersant was weighed using an analytical balance. The weight of the dish and dried dispersant was recorded to four decimal places. The solids was determined using the following equation: % solids=100×[(weight of the dish and the dry dispersant)−(weight of the empty dish)]/[(weight of the dish and the dispersant solution)−(weight of the empty dish)].

Example 2. Preparation of Binder Dispersion

In a 1-liter plastic container, was placed 23.3 grams of deionized water, 225.7 grams of the dispersant composition from Example 1, and 0.47 grams of Drewplus Y-281 defoamer (available from Ashland). The resultant mixture was stirred vigorously using a Cowles blade. This mixing was continued while 150.5 grams of polyvinylidene difluoride powder, PG-11 (available from Arkema) was added gradually. Mixing was continued for an additional 20 minutes after all the polyvinylidene difluoride powder was added. Resimene HM-2608 melamine crosslinking agent (available from Ineos Melamines, LLC) was then added to the binder dispersion at a dry solids weight ratio of PVDF: dispersant:melamine of 70/25/5.

Example 3 (Comparative). Preparation of Binder Solution in NMP

To a plastic container was added solvent grade N-methyl-2-pyrrolidone (available from Ashland, 1141.44 grams). While stirring with a Cowles blade, polyvinylidene difluoride, Kynar HSV-900 (available from Arkema, 58.56 grams) was added in portions. Stirring was continued until the polymer was completely dissolved.

Example 4. Adhesion Promoter Composition

| | Ingredients | Amount (gram) |
|---|---|---|
| Charge 1: | Primacor 5980i (ethylene - acrylic acid copolymer) available from Dow Chemical Co.) | 1441.2 |
| | Deionized water | 3603.0 |
| Charge 2: | Dimethylethanolamine | 356.56 |
| Charge 3: | Deionized water | 1805.24 |

To a suitable reaction vessel equipped with a stirrer, reflux condenser, thermometer, heating mantle and nitrogen inlet, Charge 1 was added at ambient temperatures. Under continuous mixing, the temperature was then increased to 40° C. over 20 minutes. After mixing for 20 minutes at 40° C., Charge 2 was added over 5 minutes. The reaction vessel was then heated to 75° C. over 15 minutes. Charge 3 was then added over 10 minutes and the reaction vessel was heated to 90° C. over 40 minutes. The batch was further heated to 95° C. over 30 minutes and mixed for another 30 minutes. The batch was then cooled down and filtered with a 5-micron filter. The composition had a theoretical solids content of 20% by weight.

Solids contents for all compositions other than the dispersant compositions were measured by the following procedure. An aluminum weighing dish from Fisher Scientific, was weighed using an analytical balance. The weight of the empty dish was recorded to four decimal places. Approximately 1 g of dispersion was added to the weigh dish. The weight of the dish and the wet dispersion was recorded to four decimal places. The dish containing the slurry was placed into a laboratory oven, with the oven temperature set to 120° C., and dried for 1 hour. The weigh dish and dried dispersion was weighed using an analytical balance. The weight of the dish and dried slurry was recorded to four decimal places. The solids was determined using the following equation: % solids=100×[(weight of the dish and the dry dispersion)−(weight of the empty dish)]/[(weight of the dish and the wet dispersion)−(weight of the empty dish)].

Example 5 (Comparative). Preparation of Cathodes Using a Waterborne PVDF Dispersion that Contains an Adhesion Promoter at 0% of the Total Binder Package (Percent by Weight, Based on the Total Weight of Resin Solids in the Binder)

To a plastic cup was added 1.69 grams of ethanol, 21.97 grams of deionized water, 1.06 grams of the binder dispersion from Example 2, and 1.16 grams of sodium hydroxide neutralized Acrysol ASE-60 (acid containing, crosslinked acrylic emulsion copolymer thickener, available from The Dow Chemical Company). This blend was placed in a dual-asymmetric centrifugal mixer and mixed at 2000 rpm for 5 minutes. After mixing, 28.62 grams of cathode active powder lithium nickel manganese cobalt oxide (NCM 111, available from BASF) was added to the mixture, and the resulting combination was mixed in a dual-asymmetric centrifugal mixer at 2000 rpm for 5 minutes. After mixing, 2.54 grams of Timcal C-NERGY™ Super $C_{65}$ conductive carbon (available from TIMCAL) was added, and the blend was placed in a dual-asymmetric centrifugal mixer and mixed at 2000 rpm for 10 minutes. Next, 2.26 grams of Butyl CELLOSOLVE™ glycol ether and 0.71 grams of DOWANOL™ PnB glycol ether (both available from the Dow Chemical Co.) was added and the mixture was mixed on a dual-asymmetric centrifugal mixer at 2000 rpm for 5 minutes.

A wet film was prepared on aluminum foil by a draw-down application of this formulated slurry using a doctor blade. This wet film was flashed for 15 minutes at 25° C., then heated in an oven to a temperature of 60° C. for at least 30 minutes, and then heated in an oven to maximum temperature of 246° C. for 10 minutes. After cooling, an average dry film thickness of 53 microns was determined from five measurements with a micrometer.

Battery performance data and peel strength for this coating is shown in Table 1.

Example 6. Preparation of Electrodes Using a Waterborne Binder Dispersion that Contains an Adhesion Promoter at 10% of the Total Binder Package, (Percent by Weight, Based on the Total Weight of Resin Solids in the Binder)

To a plastic cup was added 1.15 grams of ethanol, 13.75 grams of DI water, 1.20 grams of the binder dispersion from Example 2, 1.49 grams of sodium hydroxide neutralized Acrysol ASE-60, and 0.41 grams of the adhesion promoter composition from Example 4. This blend was placed in a dual-asymmetric centrifugal mixer and mixed at 2000 rpm for 5 minutes. After mixing, 36.72 grams of cathode active powder lithium nickel manganese cobalt oxide NMC-111 (electrochemically active material (Li(NiMnCo)O$_2$), available from BASF) was added to the mixture, and the resulting combination was mixed in a dual-asymmetric centrifugal mixer at 2000 rpm for 5 minutes. After mixing, 3.26 grams of Timcal C-NERGY™ Super C65 conductive carbon was added, and the blend was placed in a dual-asymmetric centrifugal mixer and mixed at 2000 rpm for 10 minutes. Next, 1.54 grams of Butyl CELLOSOLVE™ glycol ether and 0.48 grams of DOWANOL™ PnB glycol ether was added and the mixture was mixed on a dual-asymmetric centrifugal mixer at 2000 rpm for 5 minutes.

A wet film was prepared on pre-cleaned aluminum foil by a draw-down application of this formulated slurry using a doctor blade. This wet film was flashed for 15 minutes at 25° C., then heated in an oven to a temperature of 60° C. for at least 30 minutes, and then heated in an oven to maximum temperature of 246° C. for 10 minutes. After cooling, an average dry film thickness of 52 microns was determined from five measurements with a micrometer. Battery performance data and peel strength for this electrode is shown in Table 1.

Example 7. Preparation of Electrode Using a Waterborne PVDF Dispersion that Contains an Adhesion Promoter at 30% of the Total Binder Package, (Percent by Weight, Based on the Total Weight of Resin Solids in the Binder)

To a plastic cup was added 0.90 grams of ethanol, 9.43 grams of DI water, 0.99 grams of the binder dispersion from Example 2, 1.65 grams of sodium hydroxide neutralized Acrysol ASE-60 (available from the Dow Chemical Co.) and 1.35 grams of the adhesion promoter composition from Example 4. This blend was placed in a dual-asymmetric centrifugal mixer and mixed at 2000 rpm for 5 minutes. After mixing, 40.50 grams of cathode active powder NMC-111 was added to the mixture, and the resulting combination was mixed in a dual-asymmetric centrifugal mixer at 2000 rpm for 5 minutes. After mixing, 3.60 grams of Timcal C-NERGY™ Super $C_{65}$ conductive carbon was added, and the blend was placed in a dual-asymmetric centrifugal mixer and mixed at 2000 rpm for 10 minutes. Next, 1.20 grams of Butyl CELLOSOLVE™ glycol ether and 0.37 grams of DOWANOL™ PnB glycol ether was added and the mixture was mixed on a dual-asymmetric centrifugal mixer at 2000 rpm for 5 minutes.

A wet film was prepared on pre-cleaned aluminum foil by a draw-down application of this formulated slurry using a doctor blade. This wet film was flashed for 15 minutes at 25° C., then heated in an oven to a temperature of 60° C. for at least 30 minutes, and then heated in an oven to maximum temperature of 246° C. for 10 minutes. After cooling, an average dry film thickness of 52 microns was determined from five measurements with a micrometer. Battery performance data and peel strength for this coating is shown in Table 1.

Example 8. Preparation of Electrode Using a Waterborne PVDF Dispersion that Contains an Adhesion Promoter at 60% of the Total Binder Package, (Percent by Weight, Based on the Total Weight of Resin Solids in the Binder)

To a plastic cup was added 0.90 grams of ethanol, 8.42 grams of DI water, 0.49 grams of the binder dispersion from Example 2, 1.81 grams of sodium hydroxide neutralized Acrysol ASE-60, and 2.70 grams of the adhesion promoter composition from Example 4. This blend was placed in a dual-asymmetric centrifugal mixer and mixed at 2000 rpm for 5 minutes. After mixing, 40.50 grams of cathode active powder NMC-111 was added to the mixture, and the resulting combination was mixed in a dual-asymmetric centrifugal mixer at 2000 rpm for 5 minutes. After mixing, 3.60 grams of Timcal C-NERGY™ Super $C_{65}$ conductive carbon was added, and the blend was placed in a dual-asymmetric centrifugal mixer and mixed at 2000 rpm for 10 minutes. Next, 1.20 grams of Butyl CELLOSOLVE™ glycol ether and 0.37 grams of DOWANOL™ PnB glycol ether were added and the mixture was mixed on a dual-asymmetric centrifugal mixer at 2000 rpm for 5 minutes.

A wet film was prepared on pre-cleaned aluminum foil by a draw-down application of this formulated slurry using a doctor blade. This wet film was flashed for 15 minutes at 25° C., then heated in an oven to a temperature of 60° C. for at least 30 minutes, and then heated in an oven to maximum temperature of 246° C. for 10 minutes. After cooling, an average dry film thickness of 49 microns was determined from five measurements with a micrometer. Battery performance data and peel strength for this coating is shown in Table 1.

Example 9. Preparation of Electrode Using a Waterborne PVDF Dispersion that Contains an Adhesion Promoter at 100% of the Total Binder Package, (Percent by Weight, Based on the Total Weight of Resin Solids in the Binder)

To a plastic cup was added 0.79 grams of ethanol, 7.28 grams of DI water, and 4.68 grams of the acrylic acid—ethylene copolymer dispersion from Example 4. This blend was placed in a dual-asymmetric centrifugal mixer and mixed at 2000 rpm for 5 minutes. After mixing, 42.12 grams of cathode active powder lithium nickel manganese cobalt oxide (NCM 111) was added to the mixture, and the resulting combination was mixed in a dual-asymmetric centrifugal mixer at 2000 rpm for 5 minutes. After mixing, 3.74 grams of Timcal C-NERGY™ Super $C_{65}$ conductive carbon was added, and the blend was placed in a dual-asymmetric centrifugal mixer and mixed at 2000 rpm for 10 minutes. Next, 1.06 grams of Butyl CELLOSOLVE™ glycol ether and 0.33 grams of DOWANOL™ PnB glycol ether was added and the mixture was mixed on a dual-asymmetric centrifugal mixer at 2000 rpm for 5 minutes.

A wet film was prepared on pre-cleaned aluminum foil by a draw-down application of this formulated slurry using a doctor blade. This wet film was flashed for 15 minutes at 25° C., then heated in an oven to a temperature of 60° C. for at least 30 minutes, and then heated in an oven to maximum temperature of 246° C. for 10 minutes. After cooling, an average dry film thickness of 52 microns was determined from five measurements with a micrometer. Battery performance data and peel strength for this coating is shown in Table 1 below.

Example 10 (Comparative). Preparation of Cathodes Using the Comparative Binder Solution Made of PVDF Dissolved in NMP (Example 3)

To a plastic cup was added NMP (25.22 grams), binder solution from Example 3 (10.08 grams) and conductive carbon C-NERGY™ Super $C_{65}$ (2.02 grams). This blend was placed in a dual-asymmetric centrifugal mixer and mixed at 2000 rpm for 10 minutes. Cathode active powder NMC-111 (22.68 grams) was added to this mixed blend, and the resulting combination was mixed in a dual-asymmetric centrifugal mixer at 2000 rpm for 10 minutes to produce a formulated slurry.

A wet film was prepared on pre-cleaned aluminum foil by a draw-down application of this formulated slurry using a doctor blade. This wet film was heated in an oven to a maximum temperature of 150° C. for at least 5 minutes. After cooling, an average dry film thickness of 38 microns was determined from five measurements with a micrometer. Battery performance data and peel strength for this coating is shown in Table 1.

Peel strength test procedure: Peel strength was measured using the PEEL STRENGTH TEST METHOD and is reported in Table 1.

Coin cell testing procedure: The dry coated foils were passed through a roll calendar press (Innovative Machine Corporation) to achieve 25-30% compression. After vacuum drying, two coin-type half-cell batteries per dry coated foil were assembled using lithium metal as the negative electrode and one-molar LiPF6 in ethylene carbonate, diethyl carbonate and dimethyl carbonate solvents as the electrolyte. The coin cell batteries were then tested on a battery tester (Arbin Instruments) using a potential window of 4.2-3 Volts for 5 cycles each at currents corresponding to 0.2 C, 0.4 C, 0.8 C, 1.6 C, 3.2 C and 6.4 C charge/discharge rates, followed by 50 cycles at the current corresponding to a 1 C rate. Discharge capacity in milliamp-hours per gram of lithium nickel manganese cobalt oxide 1:1:1 was calculated from the average of the first 5 cycles for each C-rate. "C-rate" refers to a current value that is required to fully discharge a cell having a constant electric capacitance in a time period equal to the inverse of the C-rate value in hours. For example, discharge capacity at 0.2 C refers to dry coated film capacity in milliamp-hours per gram of lithium nickel manganese cobalt oxide at a current value required to fully discharge the battery in 5 hours. Similarly discharge capacity at 1 C refers to dry coated film capacity in milliamp-hours per gram of lithium nickel manganese cobalt oxide at a current value required to fully discharge the battery in 1 hour.

Discharge capacity averages from the higher capacity coin-type half-cell of the two replicate cells for a given dry coated foil are reported in Table 1. Capacity retention was calculated from the quotient of the discharge capacity after the first charge-discharge cycle at 1 C and the last charge-discharge cycle at 1 C and reported as percentage according to the equation: 100×first cycle capacity/last cycle capacity.

Table 1 shows the peel force of 1" wide electrodes and discharge data for coin-cell batteries prepared from Example electrodes. The table shows cell specific capacity (milliamp-hours per gram) for various discharge C-rates (per hour).

TABLE 1

| Example | Peel Force (mN) | Discharge C-Rate (hour$^{-1}$) | | | | | | % Capacity Retention after about 42 cycles at C-rate of 1.0 |
|---|---|---|---|---|---|---|---|---|---|
| | | 0.2 | 0.4 | 0.8 | 1.6 | 3.2 | 6.4 | 1.0 | |
| 5 | 102 | 152 | 148 | 140 | 135 | 126 | 112 | 140 | 99.6 |
| 6 | 161 | | | | | | | | |
| 7 | 618 | 154 | 151 | 145 | 139 | 129 | 110 | 144 | 100 |
| 8 | 726 | | | | | | | | |
| 9 | 968 | 151 | 148 | 142 | 134 | 120 | 86 | 140 | 101 |
| 10 | 549 | 155 | 152 | 147 | 141 | 134 | 123 | 146 | 99.3 |

Example 11. Synthesis of (Meth)Acrylic Polymer Dispersant with Theoretical Glass Transition Temperature (Tg) of −12.4° C.

| Ingredients | | Amount (gram) |
|---|---|---|
| Charge 1: | Triethylphosphate | 375.4 |
| Charge 2: (premixed) | Triethylphosphate | 61.1 |
| | Tertiary amyl peroxy 2-ethoxy hexyl carbonate | 12.9 |
| Charge 3: (premixed) | methyl methacrylate | 228.2 |
| | ethyl acrylate | 91.6 |
| | methacrylic acid | 0 |
| | hydroxyethyl acrylate | 11.5 |
| | ethylhexyl acrylate | 193.8 |
| | glycidyl methacrylate | 58.4 |

| Ingredients | | Amount (gram) |
|---|---|---|
| Charge 4: | Triethylphosphate | 21.99 |
| Charge 5: (premixed) | Tertiary amyl peroxy 2-ethoxy hexyl carbonate | 4.3 |
| | Triethylphosphate | 61.17 |
| Charge 6: | Triethylphosphate | 57.9 |

To a suitable reaction vessel equipped with a stirrer, condenser, thermometer, heating mantle and nitrogen inlet, Charge 1 was added at ambient temperatures. The temperature was then increased to 120° C., at which time the initiator premix of Charge 2 was added over 185 minutes. 5 minutes after the start of Charge 2, Charge 3 was added over 180 minutes. Upon completion of Charges 2 and 3, Charge 4 was added, followed by Charge 5 added over 60 minutes, followed by Charge 6 and an additional 60-minute hold at 120° C. After cooling to below 90° C., the dispersant composition thus formed had a theoretical solids content of 51.32% by weight.

Example 12. Synthesis of Acrylic Polymer Dispersant with Theoretical Glass Transition Temperature (Tg) of −12.2° C.

This polymer was prepared the same way as the polymer of Example 11, except Charge 3 consisted of the following monomers:

| Charge 3: (premixed) | methyl methacrylate | 228.2 |
|---|---|---|
| | ethyl acrylate | 58.4 |
| | methacrylic acid | 11.5 |
| | Hydroxyethyl acrylate | 11.5 |
| | Ethylhexyl acrylate | 215.7 |
| | Vinyl Pyrrolidone | 58.4 |

Example 13. Synthesis of (Meth)Acrylic Polymer Dispersant with Theoretical Glass Transition (Tg) of −12.4° C.

This polymer was prepared the same way as the polymer of Example 11 except Charge 3 consisted of the following monomers:

| Charge 3: (premixed) | methyl methacrylate | 228.2 |
|---|---|---|
| | ethyl acrylate | 157.0 |
| | methacrylic acid | 11.5 |
| | Hydroxyethyl acrylate | 11.5 |
| | Ethylhexyl acrylate | 175.3 |

Examples 14-16. Formulation of Binder Dispersions

In a 2-liter plastic container, was placed 41.64 grams of triethylphosphate, 26.85 grams of (meth)acrylic copolymer dispersant composition from Example 12. The resultant mixture was stirred vigorously using a Cowles blade while maintaining a modest vortex. This mixing was continued while 32.90 grams of polyvinylidene difluoride powder, PVDF T-1 (Inner Mongolia 3F Wanhao Fluorochemical Co., Ltd) was added in small portions. Mixing was continued for an additional 30 minutes after all the polyvinylidene difluoride powder was added.

By similar procedures, as shown in the table below, PVDF dispersions were prepared from combinations of (meth) acrylic copolymer dispersant compositions and PVDF at the specified weight ratios.

| Example | (Meth)acrylic Copolymer from: | Polyvinylidene Difluoride | PVDF weight percent of dry solid components | Acrylic polymer weight percent of dry solid components |
|---|---|---|---|---|
| Example 14 | Example 11 | PVDF T-1 | 70.9 | 29.1 |
| Example 15 | Example 12 | PVDF T-1 | 69.7 | 30.3 |
| Example 16 | None | Kynar HSV 900 (Arkema) | 100 | 0 |

Example 17. (Comparative) Preparation of Electrode Using a Slurry with No Adhesion Promoter To a plastic cup was added triethylphosphate (14.83 grams), the binder dispersion from Example 15 (2.15 grams). Conductive carbon LITX200 (0.72 grams, available from Cabot Corp.) was added in two portions with each sequential blend mixed in a dual-asymmetric centrifugal mixer at 2000 rpm for 5 minutes. Cathode active powder NMC-111 (22.33 grams) was added in two portions to this mixed blend, with each sequential blend mixed in a dual-asymmetric centrifugal mixer at 2000 rpm for 5 minutes to produce formulated slurry. The total non-volatiles content of this slurry was 60%. The final ratio of NMC-111:LITX200: Binder dry solids was 93:3:4.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 106 microns was determined from five measurements with a micrometer. The dry film was pressed in a pinch-roller calender press (Innovative Machine Co.) to a film thickness of 87 microns. The resultant film's adhesion was tested was measured using the PEEL STRENGTH TEST METHOD. Tested as such, the coating demonstrated a 90-degree peel strength of 7.9 N/m.

Example 18. Slurry Composition and Electrode

To a plastic cup was added triethylphosphate (12.46 grams), the binder dispersion from Example 15 (1.83 grams), and an adhesion promoter composition of vinylidene fluoride-acrylic acid copolymer (Solef 5130 available from Solvay) dissolved in triethylphosphate at 5.40% w/w (2.68 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.32 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200: Binder dry solids was 93:3:4.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 109 microns was determined from five measurements with a micrometer. The dry film was calender-pressed to a film thickness of 90 microns and demonstrated a 90-degree peel strength of 16.7 N/m as measured using the PEEL STRENGTH TEST METHOD.

Example 19. Slurry Composition and Electrode

To a plastic cup was added triethylphosphate (10.13 grams), the binder dispersion from Example 15 (1.51 grams), and an adhesion promoter composition of vinylidene fluoride-acrylic acid copolymer (Solef 5130) dissolved in triethylphosphate at 5.40% w/w (5.33 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.33 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 106 microns was determined from five measurements with a micrometer. The dry film was calender-pressed to a film thickness of 88 microns and demonstrated a 90-degree peel strength of 29.3 N/m as measured using the PEEL STRENGTH TEST METHOD.

Example 20

To a plastic cup was added triethylphosphate (7.00 grams), the binder dispersion from Example 15 (1.08 grams), and an adhesion promoter composition of vinylidene fluoride-acrylic acid copolymer (Solef 5130) dissolved in triethylphosphate at 5.40% w/w (8.89 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.34 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 106 microns was determined from five measurements with a micrometer. The dry film was calender-pressed to a film thickness of 90 microns and demonstrated a 90-degree peel strength of 39.0 N/m as measured using the PEEL STRENGTH TEST METHOD.

Example 21

To a plastic cup was added triethylphosphate (1.87 grams), the binder dispersion from Example 16 (0.77 grams), an adhesion promoter composition of vinylidene fluoride-acrylic acid copolymer (Solef 5130) dissolved in triethylphosphate at 6.30% w/w (1.49 grams), and the dispersant composition from Example 11 diluted to 0.63% w/w in triethylphosphate (15.52 grams). Conductive carbon LITX200 (1.66 grams) was added in two portions with each sequential blend mixed in a dual-asymmetric centrifugal mixer at 2000 rpm for 5 minutes. Cathode active powder NMC-111 (18.72 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:LITX200:Binder dry solids was 90:8:2.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 65 microns was determined from five measurements with a micrometer. The dry film was calender-pressed to a film thickness of 45 microns and demonstrated a 90-degree peel strength of 9.8 N/m as measured using the PEEL STRENGTH TEST METHOD.

Example 22

To a plastic cup was added triethylphosphate (9.41 grams), the binder dispersion from Example 16 (0.53 grams), an adhesion promoter composition of vinylidene fluoride-acrylic acid copolymer (Solef 5130) dissolved in triethylphosphate at 6.30% w/w (3.59 grams), and the dispersant composition from Example 11, diluted to 0.63% w/w in triethylphosphate (6.21 grams). Conductive carbon LITX200 (1.66 grams) was added in two portions with each sequential blend mixed in a dual-asymmetric centrifugal mixer at 2000 rpm for 5 minutes. Cathode active powder NMC-111 (18.75 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:LITX200:Binder dry solids was 90:8:2.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 70 microns was determined from five measurements with a micrometer. The dry film was calender-pressed to a film thickness of 49 microns and demonstrated a 90-degree peel strength of 15.4 N/m as measured using the PEEL STRENGTH TEST METHOD.

Example 23

To a plastic cup was added triethylphosphate (0.69 grams), the binder dispersion from Example 16 (0.43 grams), an adhesion promoter composition of vinylidene fluoride-acrylic acid copolymer (Solef 5130) dissolved in triethylphosphate at 6.30% w/w (2.98 grams), and the dispersant composition from Example 11 diluted to 0.63% w/w in triethylphosphate (15.56 grams). Conductive carbon LITX200 (1.67 grams) was added in two portions with each sequential blend mixed in a dual-asymmetric centrifugal mixer at 2000 rpm for 5 minutes. Cathode active powder NMC-111 (18.76 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:LITX200:Binder dry solids was 90:8:2.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 66 microns was determined from five measurements with a micrometer. The dry film was calender-pressed to a film thickness of 47 microns and demonstrated a 90-degree peel strength of 5.5 N/m as measured using the PEEL STRENGTH TEST METHOD.

Example 24

To a plastic cup was added triethylphosphate (10.73 grams), the binder dispersion from Example 16 (0.90 grams), an adhesion promoter composition of vinylidene fluoride-acrylic acid copolymer (Solef 5130) dissolved in triethylphosphate at 6.30% w/w (1.78 grams), and the dispersant composition from Example 11 diluted to 0.63% w/w in triethylphosphate (6.24 grams). Conductive carbon LITX200 (1.67 grams) was added in two portions with each sequential blend mixed in a dual-asymmetric centrifugal mixer at 2000 rpm for 5 minutes. Cathode active powder NMC-111 (18.78 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:LITX200:Binder dry solids was 90:8:2.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 72 microns was determined from five measurements with a micrometer. The dry film was calender-pressed to a film thickness of 52 microns and demonstrated a 90-degree peel strength of 12.5 N/m as measured using the PEEL STRENGTH TEST METHOD.

Example 25

To a plastic cup was added triethylphosphate (13.95 grams), the binder dispersion from Example 16 (0.56 grams), an adhesion promoter composition of vinylidene fluoride-acrylic acid copolymer (Solef 5130) dissolved in triethylphosphate at 6.30% w/w (2.60 grams), and the dispersant composition from Example 11 (0.09 grams). Conductive carbon Denka Black (1.46 grams) was added in two portions with each sequential blend mixed in a dual-asymmetric centrifugal mixer at 2000 rpm for 5 minutes. Cathode active powder NMC-111 (16.40 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:Denka Black:Binder dry solids was 90:8:2.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 95 microns was determined from five measurements with a micrometer. The dry film was calender-pressed to a film thickness of 52 microns and demonstrated a 90-degree peel strength of 2.2 N/m as measured using the PEEL STRENGTH TEST METHOD.

Example 26 (Comparative). Preparation of Electrode Using a Slurry with No Binder or Dispersant To a plastic cup was added triethylphosphate (2.53 grams) and an adhesion promoter composition of vinylidene fluoride-acrylic acid copolymer (Solef 5130) dissolved in triethylphosphate at 5.00% w/w (13.45 grams). Conductive carbon LITX200 (0.51 grams) was added in one portion and the blend mixed in a dual-asymmetric centrifugal mixer at 2000 rpm for minutes. Cathode active powder NMC-111 (15.62 grams) was added in two portions to this mixed blend, with each sequential blend mixed in a dual-asymmetric centrifugal mixer at 2000 rpm for 5 minutes to produce formulated slurry. The total non-volatiles content of this slurry was 52% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 120° C. for at least 10 minutes. After cooling, an average dry film thickness of 89 microns was determined from five measurements with a micrometer. The dry film was calender-pressed to a film thickness of 65 microns and demonstrated a 90-degree peel strength of 60.4 N/m as measured using the PEEL STRENGTH TEST METHOD.

Example 27 (Comparative). Preparation of Electrode Using a Slurry with No Adhesion Promoter To a plastic cup was added triethylphosphate (14.71 grams) and the binder dispersion from Example 14 (2.27 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.33 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 68° C. for at least 10 minutes. After cooling, an average dry film thickness of 74 microns was determined from five measurements with a micrometer. The dry film was calender-pressed to a film thickness of 57 microns and demonstrated a 90-degree peel strength of 11.2 N/m as measured using the PEEL STRENGTH TEST METHOD.

Example 28

To a plastic cup was added triethylphosphate (12.37 grams), the binder dispersion from Example 14 (1.93 grams) and an adhesion promoter composition of vinylidene fluoride-acrylic acid copolymer (Solef 5130) dissolved in triethylphosphate at 5.40% w/w (2.67 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.32 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 68° C. for at least 10 minutes. After cooling, an average dry film thickness of 74 microns was determined from five measurements with a micrometer. The dry film was calender-pressed to a film thickness of 56 microns and demonstrated a 90-degree peel strength of 36.5 N/m as measured using the PEEL STRENGTH TEST METHOD.

Example 29

To a plastic cup was added triethylphosphate (10.04 grams), the binder dispersion from Example 14 (1.58 grams), and an adhesion promoter composition of vinylidene fluoride-acrylic acid copolymer (Solef 5130) dissolved in triethylphosphate at 5.40% w/w (5.33 grams). Conductive carbon LITX200 (0.72 grams) was added in two portions with each sequential blend mixed in a dual-asymmetric centrifugal mixer at 2000 rpm for 5 minutes. Cathode active powder NMC-111 (22.33 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 68° C. for at least 10 minutes. After cooling, an average dry film thickness of 75 microns was determined from five measurements with a micrometer. The dry film was calender-pressed to a film thickness of 57 microns and demonstrated a 90-degree peel strength of 51.6 N/m as measured using the PEEL STRENGTH TEST METHOD.

Example 30

To a plastic cup was added triethylphosphate (6.95 grams), the binder dispersion from Example 14 (1.14 grams), an adhesion promoter composition of vinylidene fluoride-acrylic acid copolymer (Solef 5130) dissolved in triethylphosphate at 5.40% w/w (8.90 grams). Conductive carbon LITX200 (0.73 grams) was added in two portions with each sequential blend mixed in a dual-asymmetric centrifugal mixer at 2000 rpm for 5 minutes. Cathode active powder NMC-111 (22.33 grams) was added in two portions to this mixed blend, with each sequential blend mixed in a dual-asymmetric centrifugal mixer at 2000 rpm for 5 minutes to produce formulated slurry. The total non-volatiles content of this slurry was 60% by weight. The final weight ratio of NMC-111:LITX200:Binder dry solids was 93:3:4.

A wet film was prepared on pre-cleaned aluminum foil by a draw-down application of this formulated slurry using a doctor blade. This wet film was heated in an oven to a maximum temperature of 68° C. for at least 10 minutes. After cooling, an average dry film thickness of 72 microns was determined from five measurements with a micrometer. The dry film was calender-pressed to a film thickness of 56 microns and demonstrated a 90-degree peel strength of 79.9 N/m as measured using the PEEL STRENGTH TEST METHOD.

Examples 17-20 demonstrate that the addition of more adhesion promoter yields higher peel strength than dispersed PVDF alone for 93:3:4 using LITX 200 conductive carbon. Examples 21-24 demonstrate that an adhesion promoter yields higher peel strength in 90:8:2 with LITX/NMC. Example 25 demonstrates that an adhesion promoter yields higher peel strength with Denka black in 90:8:2. Example 26 (Comparative) demonstrates that an adhesion promoter alone in TEP does not yield high peel strength using NMC & LITX at 93:3:4. Examples 27-30 demonstrate that more adhesion promoter yields higher peel strength than dispersed PVDF alone for 93:3:4 using LITX 20 conductive carbon, but this time with a lower bake temp and thinner films.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A slurry composition comprising:
   (a) an electrochemically active material;
   (b) a binder comprising a polymer comprising a fluoropolymer dispersed in an organic medium comprising a primary solvent and a co-solvent, wherein the primary solvent comprises butyl pyrrolidone, a trialkylphosphate, 3-methoxy-N,N-dimethylpropanamide, 1,2,3-triacetoxypropane, or combinations thereof, and the co-solvent comprises ethyl acetoacetate, gamma-butyrolactone, propylene glycol methyl ether, dipropylene glycol methyl ether, propylene glycol monopropyl ether, diethylene glycol monobutyl ether, ethylene glycol monohexyl ether, or combinations thereof; and
   (c) an adhesion promoter.

2. The slurry composition of claim 1, wherein the adhesion promoter comprises a polyvinylidene fluoride copolymer.

3. The slurry composition of claim 2, wherein the polyvinylidene fluoride copolymer comprises constitutional units comprising the residue of vinylidene fluoride and at least one of:
   (i) (meth)acrylic acid; or
   (ii) hydroxyalkyl (meth)acrylate.

4. The slurry composition of claim 3, wherein the (meth)acrylic acid comprises acrylic acid.

5. The slurry composition of claim 3, wherein the hydroxyalkyl (meth)acrylate comprises a $C_1$ to $C_5$ hydroxyalkyl (meth)acrylate.

6. The slurry composition of claim 5, wherein the $C_1$ to $C_5$ hydroxyalkyl (meth)acrylate comprises hydroxyethyl (meth)acrylate, 2-hydroxypropyl (meth)acrylate, 2-hydroxybutyl (meth)acrylate, or combinations thereof.

7. The slurry composition of claim 1, wherein the primary solvent comprises triethylphosphate, and the co-solvent comprises ethyl acetoacetate.

8. The slurry composition of claim 1, wherein the organic medium has a temperature at which the fluoropolymer disperses and an evaporation rate less than 10 grams per square meter per minute, at that temperature.

9. The slurry composition of claim 8, wherein the organic medium has an evaporation rate greater than 80 grams per square meter per minute, at 180° C.

10. The slurry composition of claim 1, further comprising an electrically conductive agent.

11. The slurry composition of claim 10, wherein the electrically conductive agent comprises graphite, acetylene black, furnace black, graphene, carbon nanotubes, or combinations thereof.

12. The slurry composition of claim 10, wherein the electrically conductive agent comprises carbon nanotubes.

13. The slurry composition of claim 10, wherein the electrically conductive agent comprises conductive carbon material having a surface area of 100 $m^2$/g to 1000 $m^2$/g.

14. The slurry composition of claim 1, wherein the slurry is substantially free of isophorone.

15. The slurry composition of claim 1, wherein the slurry is substantially free of N-methyl-2-pyrrolidone.

16. A slurry composition comprising:
   (a) an electrically conductive agent;
   (b) a binder comprising a polymer comprising a fluoropolymer dispersed in an organic medium comprising a primary solvent and a co-solvent, wherein the primary solvent comprises butyl pyrrolidone, a trialkylphosphate, 3-methoxy-N,N-dimethylpropanamide, 1,2,3-triacetoxypropane, or combinations thereof, and the co-solvent comprises ethyl acetoacetate, gamma-butyrolactone, propylene glycol methyl ether, dipropylene glycol methyl ether, propylene glycol monopropyl ether, diethylene glycol monobutyl ether, ethylene glycol monohexyl ether, or combinations thereof; and
   (c) an adhesion promoter.

17. An electrode comprising:
   (a) an electrical current collector; and
   (b) a film formed on the electrical current collector, wherein the film is deposited from the slurry composition of claim 1.

18. An electrical storage device comprising:
   (a) the electrode of claim 17;
   (b) a counter electrode; and
   (c) an electrolyte.

19. The electrical storage device of claim 18, wherein the electrical storage device comprises a cell, a battery pack, a secondary battery, a capacitor, or a supercapacitor.

* * * * *